United States Patent
Pickles

[15] 3,690,206
[45] Sept. 12, 1972

[54] CUTTING PRESS CONTROLS
[72] Inventor: Harry Pickles, Anstey, England
[73] Assignee: USM Corporation, Boston, Mass.
[22] Filed: Oct. 16, 1970
[21] Appl. No.: 81,252

[30] Foreign Application Priority Data
Oct. 22, 1969 Great Britain..........51,725/69

[52] U.S. Cl. ..................83/537, 83/544, 100/53, 192/30
[51] Int. Cl. ..............................B26d 7/24
[58] Field of Search..................83/397, 536–538, 83/535, 544; 100/53; 192/130, 131; 74/612, 614, 615

[56] References Cited
UNITED STATES PATENTS 2,401,302   6/1946   Hooper..................83/544 X
3,276,557   10/1966  Brown...................192/130 X
1,010,476   12/1911  Buckminster..............83/537
3,149,522   9/1964   Newton..................83/652 X

*Primary Examiner*—Donald G. Kelly
*Attorney*—Richard A. Wise and Richard B. Megley

[57] ABSTRACT

A cutting press having a head and a support transversely movable relative to each other and cooperative to cut material on the support is provided with a control for terminating the relative transverse movement of the head and support upon contact with an obstruction in the path of the movement. The control locates the head relative to the support over a desired area of the support and prevents damage to the obstruction or the press.

5 Claims, 3 Drawing Figures

Inventor
Harry Pickles
By his Attorney

Richard A. Wise

CUTTING PRESS CONTROLS

BACKGROUND OF THE INVENTION

This invention relates to a control for a cutting press of a type in which a head for cutting material placed on a support beneath the head is relatively movable transversely of the support to expose the material beneath the head to the operator's view. The head and support are also mounted for relative movement of approach and separation to engage a die placed on the material to cut the material.

In one such type of press, known in the shoemaking industry as a "clicking press," the head is a beam pivotally mounted on a column for swinging movement of traverse parallel to the plane of a support beneath the beam. The beam swings from a "parking" position in which the beam is laterally spaced from the support to expose the support to the operator's view, to a cutting position in which the beam overlies the support preparatory to cutting material on the support. To effect cutting, the column is provided with means to move the beam toward the support to engage a die placed on the material to press the die through the material to cut the material.

In the past, the operator manually traversed the beam between the cutting and parking positions. Such operation is both slow and fatiguing. More recently, therefore, clicking presses having drive means for traversing the beam have become available.

In one such press, a lever for controlling the head swing or traverse is mounted on a front panel of the press. To use this press, the operator must place one hand on the lever at the front of the press to initiate traverse of the head. Since it is common practice for operators to use two hands to manipulate dies on the material to be cut, the operator must first place the die and then initiate traverse of the head after which he must wait during the entire traversing motion of the head before he can initiate cutting movement of the head. Such delay is time consuming and costly.

If the operator attempts to initiate traversing movement of the head prior to locating the die, the head may reach the die before the operator removes his hands from the die. Such operation presents a significant safety hazard since the clearance between the die and the head is frequently such that the head will pinch the operator's hand between the die and the head. This problem is particularly acute in the shoemaking industry where the irregularities of the leather material commonly employed require accurate placement of the die which may take longer than traversing movement of the head.

SUMMARY OF THE INVENTION

It is therefore an object of the present invention to provide a control for a cutting press of the type described in which less time is required to locate the head in the cutting position and to provide a safety mechanism to terminate traversing movement of the head upon contact with an obstruction.

To this end the present invention provides a cutting press having a head and a support for material to be cut transversely movable relative to each other, a treadle to initiate movement of the press head and means for terminating traversing movement of the head when the head contacts an obstruction in the path of movement.

The means for terminating movement of the head comprise an arm mounted on an edge of the head which leads the traversing movement of the head and means responsive to contact of the arm with an obstruction for terminating movement of the head. Additional means for restarting movement of the platen after termination of such movement by the arm are provided.

BRIEF DESCRIPTION OF THE DRAWINGS

For purposes of illustration, and not as a limitation on the invention, a press embodying the instant invention is shown in the drawings, wherein.

DESCRIPTION OF THE PREFERRED EMBODIMENTS

Figure 1:
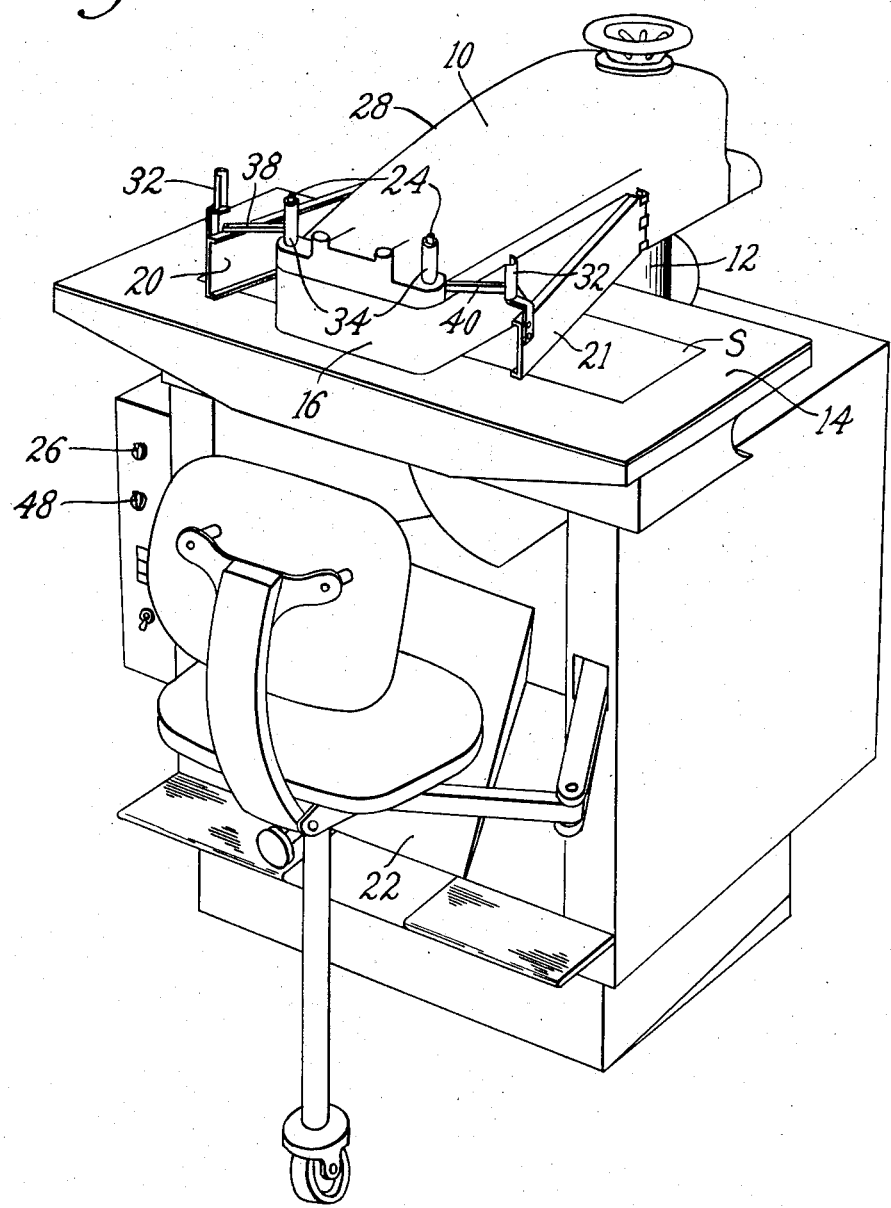
FIG. 1 is a perspective view of a press embodying the invention.

As shown in FIG. 1 a press embodying the invention has a head beam 10 pivotally supported on column 12 over a support bed 14 for supporting a sheet of material S to be cut on the press. A platen 16 is secured to the lower side of the head to engage a die 18 (shown in FIG. 2) to cut the material. Arms 20 and 21 are pivotally mounted on either side of the head adjacent the edges of the platen which lead clockwise or counterclockwise traversing movement of the head about the pivot column 12.

A treadle 22 activates an electric motor M (FIG. 3) to swingingly traverse the head from a parking position (not shown) in which the platen is not over the material S to the cutting position in which the platen is positioned over the material as shown.

Switch buttons 24 are mounted on the head adjacent the arms 20, 21. Operator activation of the switches controlled by the buttons 24 is effective to initiate a cutting stroke of the press in which the head approaches the support to force the die through the material on the support. Means (not shown) to terminate approaching movement of the beam and to return the beam to its position at the start of the cutting stroke are provided.

The press has two parking positions for the head at either side of the position shown in FIG. 1. A switch 26 is effective to control the parking position from which the press operates. Operation of the press from either parking position is entirely analagous to operation from the other parking position. Therefore, only operation of the press from the parking position adjacent the right-hand side of the press as seen in FIG. 1 will be described.

When 20 is head moves from the right-hand parking position to the cutting position shown in FIG. 1, the left side 28 of the head will lead the motion of the head. The left arm 20 will thus lead the head and first encounter any obstruction in the path of the head.

Figure 2:
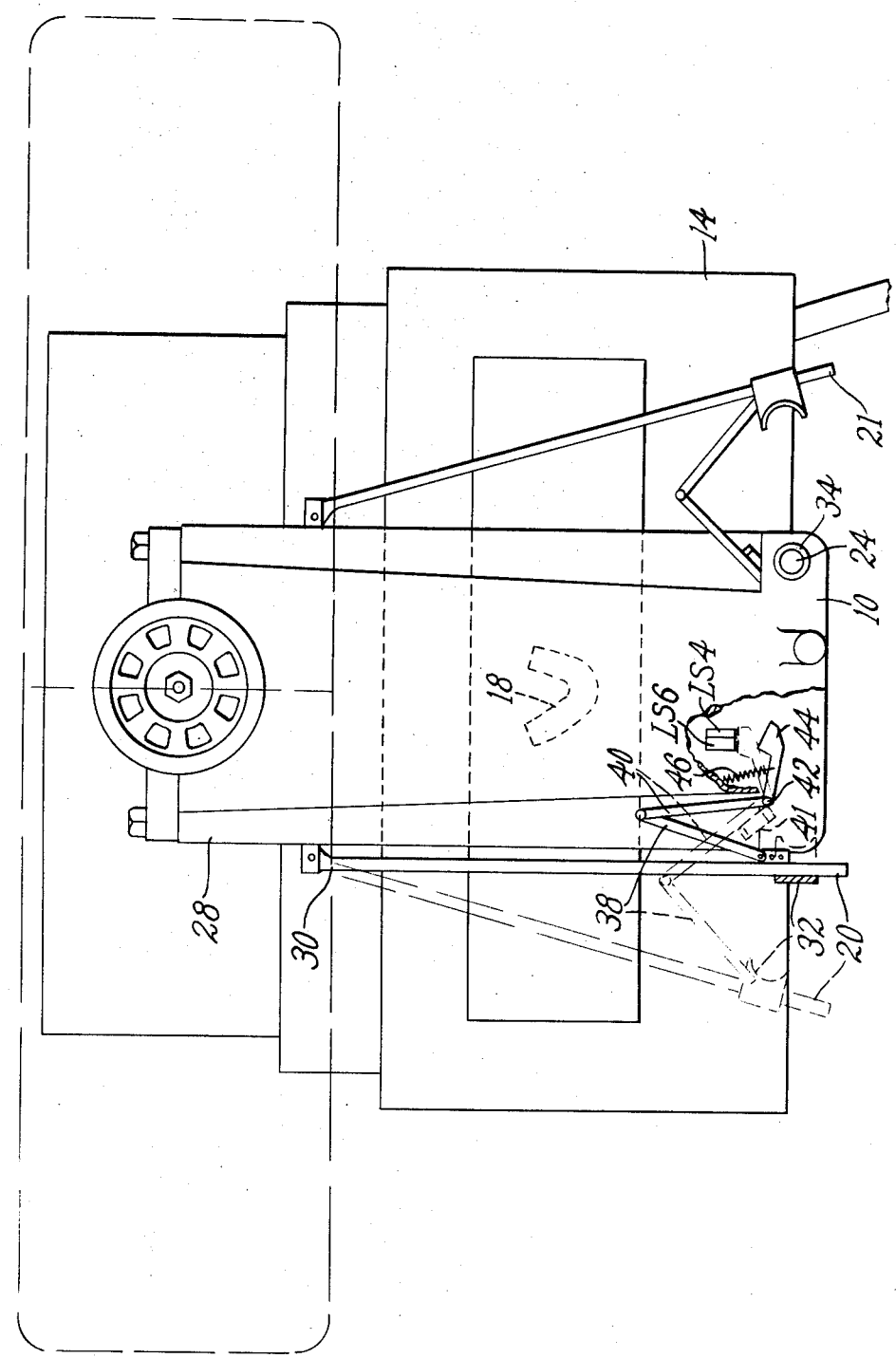
FIG. 2 is a top view of the press shown in FIG. 1 with certain parts shown in the position taken upon encountering an obstruction and, in phantom, the position shown in FIG. 1.

As seen in FIG. 2 the arm 20 is pivotally attached to the head at one end 30 for movement from its extended position shown in phantom, to a closed position adjacent the beam. A hand grip 32 is secured at the other end of the arm. The hand grip is semi-cylindrical to embrace a cylindrical housing 34 (left housing not shown) mounted on the head. The housing supports the switch and its button 24 at its upper end which is effective to initiate a cutting stroke of the press.

The arm is connected by a link 38 to an arm 40 of a bell crank pivotally connected to the head at a pivot 42. A second arm 44 of the bell crank is connected to the beam by a spring 46 to yieldably hold the arm in the extended position shown in phantom in FIG. 2.

In the extended position the second arm 44 of the bell crank engages limit switches LS4 and LS6. Upon movement of the arm 20 to its closed position, the arm 44 of the bell crank pivots out of engagement with the limit switches. The limit switches are effective to stop traversing movement of the head preparatory to a cutting stroke of the head.

Operation of the press may now be described with particular reference to FIG. 3. When the beam is in the right-hand parking position, a limit switch LS3 is moved by a cam (not shown) from the position shown in FIG. 3 to its other contact in a line 100. Operator activation of the treadle 22 (in FIG. 1) is effective to close a switch FTS which completes the circuit in line 100 through a relay coil RL4. Energizing relay RL4 closes its contacts RL4-1 and RL4-2. Contact RL4-1 provides a circuit through a switch LS2 for energizing a relay CON1 in a line 104. Energizing the relay CON1 causes its contact CON1-1 to latch relay CON1, contact CON1-2 to open to disable a relay CON2, contact CON1-3 to open to disable a head cutting stroke circuit, contact CON1-4 to close to remove a braking effect on the motor M, and ganged contacts CON1-5 to close to supply power to the motor M to cause the head to traverse towards the cutting position shown in FIG. 1. Movement of the head from the parking position causes a switch LS3 to return to the position shown in FIG. 3.

The operator gauges the position in which the head is to be positioned for the cutting operation and places his hand adjacent that position to contact the arm 20. When the arm contacts his hand, the arm pivots to its closed position shown in FIG. 2 whereupon the link and bell crank move to open limit switch LS6. Opening the limit switch LS6 causes the relay CON1 to be deenergized whereupon its contacts return to the positions shown in FIG. 3 and the drive to the head from motor M is discontinued.

Braking action on the motor produced by opening contact CON1-4 stops the head. Due to the momentum of the head, it traverses a small distance after braking has begun. To compensate for this "overshoot" and to stop the head before the leading edge of the head reaches the obstruction of the operator's hand, the arm 20 is spaced from the edge of the head a distance equal to the "overshoot." For this purpose a stop member 41 is adjustably mounted on the head 10, as in slots (not shown) in the head, to limit movement of the bell crank arm 40 to properly space arm 20 from the edge of the head a distance equal to the "overshoot." Traversing movement of the head is thus terminated before the leading edge of the head reaches the obstruction.

A limit switch LS4, adjacent switch LS6, is closed by the same bell crank action which opens switch LS6. Switch LS4 provides a circuit through a line 113 to the contacts of switches 24 used during a cutting stroke. Switch LS4 thus provides a safety feature to prevent initiation of a cutting stroke during head traverse.

A cutting stroke of the press may then be performed by operator activation of the switches 24. Moving the switches 24 to the contacts in line 118 causes a hydraulic motor and associated circuit indicated generally by box 50 to move the head toward the support 14 to press the die through the material. Release of the switches 24 is effective first to return the head to its raised cutting position and then to stop operation of the hydraulic motor.

Movement of the contacts of the switches 24 into line 118 also opens the circuit in a line 116 through a relay RL5. Contact RL5-1 of relay RL5 then opens to disable relays CON1 and CON2. This is a safety measure to prevent beam movement during a cutting stroke.

After a cutting stroke has been completed by the return of the head to its raised cutting position, a delay relay RL3 is fully energized by a pulse from timing the circuit of line 106. Contact RL3-1 (line 126) of relay RL3 then moves from the position shown in FIG. 3 to complete a circuit through limit switch LS3 which energizes a parking relay RL2 in line 126.

Energizing the relay RL2 causes its contacts RL2-1 and RL2-2 to close. Closing contact RL2-2 latches relay RL2 since contact RL3-1 switches back to the position shown in FIG. 3 after the timing pulse has passed through relay RL3. Closing contact RL2-1 provides a circuit through contacts RL5-1 RL3-1 and to relay CON2. Energizing relay CON2 causes contact CON2-1 to close to latch CON2, CON2-2 to open to disable relay CON1, contact CON2-3 to open to disable the cutting stroke circuit, contact CON2-4, in parallel with contact CON1-4, to close to remove a braking effect on the motor M, and ganged contacts CON2-5 close to supply power to the motor M to move the beam to its parking position.

Figure 3:
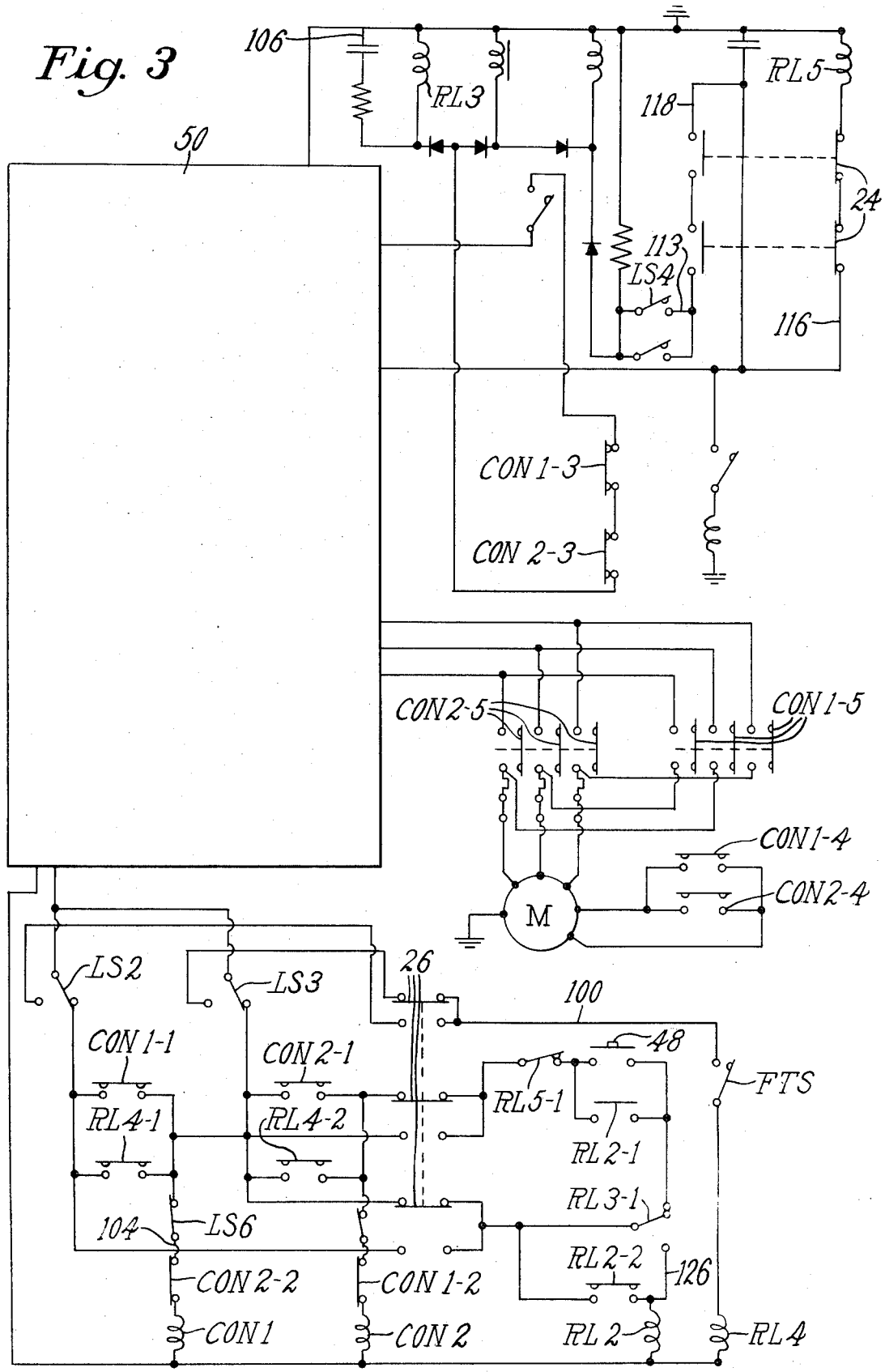
FIG. 3 is a circuit diagram of the control mechanism for the press shown in FIG. 1.

When the beam approaches its parking position the limit switch LS3 is returned by the cam (not shown) to the position not shown in FIG. 3 which disables relay CON2. Disabling relay CON2 terminates the power to the motor by opening contacts CON2-5 and establishes a braking effect on the motor M by opening contact CON2-4. The head is thus arrested in its parking position.

The arm 20 also serves as a safety device. Contact of the arm with an obstruction at any time during head movement of traverse is effective through limit switch LS6 to terminate movement of the head as described above. The beam movement is thus arrested before the head itself contacts the obstruction. Damage to the press or the obstruction is thus avoided. A reset switch 48 may then be moved to complete a circuit through relay CON2 to cause the head to return to its parking position.

The switch 26 is effective to reverse the respective actions of the elements shown in FIG. 3 to cause the head to operate from the other parking position from that described.

Having thus described my invention, what I claim as new and desire to secure by Letters Patent of the United States is:

1. A control for a cutting press having a head and a support for receiving material to be cut, the head and support being mounted for relative movement of approach and separation for engaging a die on the material to cut the material and for relative movement of traverse from a position in which the head is laterally spaced from the support to a position in which the head is over a die on the support preparatory to engaging the die, having means for effecting the relative movements of the head and support and having controls for the moving means, in which the control for the relative traversing movement of the head and support comprises: an arm mounted on an edge of the head leading the relative movement of traverse, and means operative in response to contact of the arm with an obstruction for terminating the relative movement of traverse.

2. A control as in claim 1, wherein: the arm is yieldably mounted on the head for movement toward the head upon contact with an obstruction and the head movement terminating means is responsive to movement of the arm toward the head.

3. A control as in claim 1 wherein the arm is spaced from the head a distance equal to that traversed by the head after the arm contacts the obstruction for terminating traverse before the head reaches the obstruction.

4. A cutting press, which comprises: a head and a support mounted for relative movement of approach and separation for engaging a die on material on the support to cut the material and mounted for relative movement of traverse from a position in which the head is laterally spaced from the support to a position in which the head is over a die on the support preparatory to engaging the die, means for effecting the relative movements of the head and support, an arm yieldably mounted on an edge of the head leading movement of traverse for movement toward the head upon contact with an obstruction, and means operative in response to movement of the arm toward the head for terminating the relative traversing movement of the head.

5. A cutting press as in claim 4 wherein the arm is spaced from the head a distance equal to that traversed by the head after the arm contacts the obstruction for terminating traverse before the head reaches the obstruction.

* * * * *